G. W. JOHANSSON.
CREAM SEPARATOR.
APPLICATION FILED DEC. 20, 1918.
1,296,399. Patented Mar. 4, 1919.
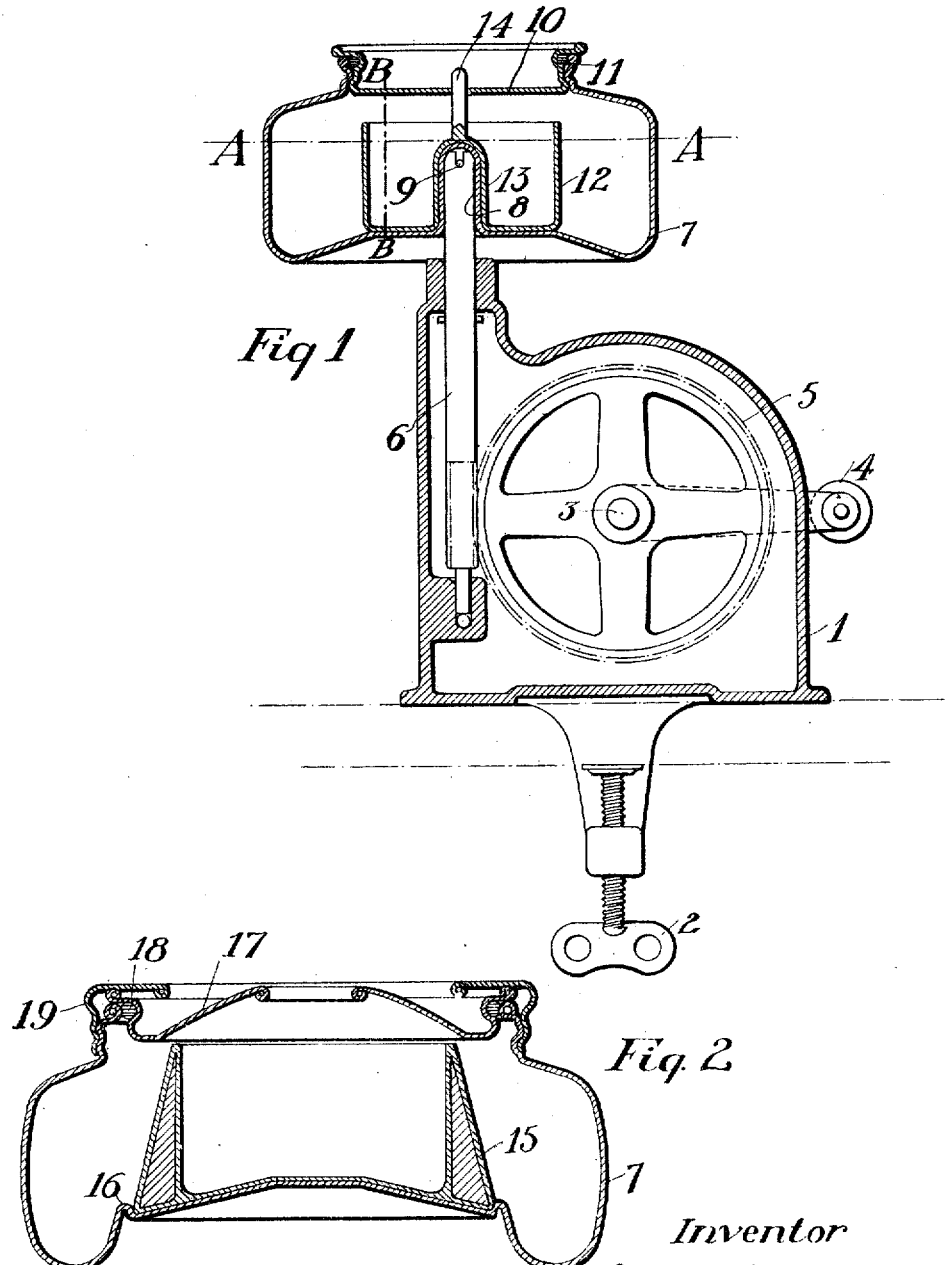
Inventor
Gustaf Wilhelm Johansson
by H. van Dedemvel
his Attorney

UNITED STATES PATENT OFFICE.

GUSTAF WILHELM JOHANSSON, OF SÖDERTELJE, SWEDEN, ASSIGNOR TO AKTIEBOLAGET BALTIC, OF STOCKHOLM, SWEDEN, A CORPORATION OF SWEDEN.

CREAM-SEPARATOR.

1,296,399.   Specification of Letters Patent.   Patented Mar. 4, 1919.

Application filed December 20, 1918. Serial No. 267,693.

*To all whom it may concern:*

Be it known that I, GUSTAF WILHELM JOHANSSON, a subject of the King of Sweden, and resident of Lowisinsgatan 9, Södertelje, in the Kingdom of Sweden, have invented certain new and useful Improvements in Cream-Separators, of which the following is a specification, reference being had therein to the accompanying drawings.

This invention relates to a separator which may be cheaply made, easily managed and which operates intermittently.

Figure 1 in the accompanying drawings is a vertical section of a cream-separator arranged in accordance with this invention, Fig. 2 is a vertical section of a modified form of the invention.

1, Fig. 1, is a frame of the separator, which may be fixed to a support, a table or the like, by means of a screw 2. In the said frame 1 a shaft 3 is journaled provided with a manually actuated crank 4 and a worm wheel 5 engaging a vertical screw-spindle 6, journaled in the frame and carrying the separator drum 7. The central part 8 of the bottom of said drum is sleeve-shaped and slid on the fork-shaped spindle 6, to which it is connected by a pin 9. The said drum has a cover 10 with a tightening ring 11. 12 is a cream receiving vessel which is loosely mounted in the drum 7. The said vessel has a sleeve shaped bottom part 13 inclosing the sleeve shaped bottom part 8 of the drum. 14 is a handle provided on the said vessel.

The described separator operates in the following manner. Into the drum milk is poured for instance to the level A—A, the drum being then rotated by means of the crank 4, worm wheel 5 and screw spindle 6. When sufficiently great velocity is imparted to the drum, the surface of the milk occupies the vertical position indicated by the dotted lines B—B. By the centrifugal action the cream is forced toward the center line of the drum and is spread on the surface of the skim milk. After a few minutes the separation is effected. As the velocity is then reduced, the level returns to the horizontal position. According as the level returns to the horizontal position the vessel 12 rises, containing the seperated cream. The thickness of the cream is dependent on the quantity of the milk charged into the drum and may be carefully controlled. If the quantity of the milk to be treated does not fill up the drum skim milk may be added.

In the preferred form of the separator shown in Fig. 2 the outside of the cream receiving vessel 15 located on the bottom of the drum 7 is conical or has a slanting position inward from the bottom for its whole height or for a part of the same, so that the greatest distance of the said wall to the center line of the vessel is at the bottom of the same. The said vessel is surrounded at its bottom edge by a ridge 16 formed in the bottom of the drum 7.

The separator shown in Fig. 2 operates in the same manner as the separator shown in Fig. 1. While during the separating operation the cream particles pass inward toward the center of the drum, they strike the outer slanting surface of the vessel 15 and then move along the same upward to the top edge of the vessel from which they enter the vessel. Consequently, substantially no cream will stick to the outer side of the vessel, as on the other hand may occur at the vessel shown in Fig. 1. For the said reason a more complete collection of the cream is effected in the separator shown in Fig. 2. The cream separated at the bottom of the drum passes from the ridge 16 to a part of the outer surface of the vessel 15 located at some distance from the bottom edge of the same, owing to which fact the said cream is prevented from entering between the bottom of the drum and the bottom of vessel, which constribues also to the complete collection of the cream.

Inside the vessel 15 is preferably so shaped that its diameter at the bottom is equal to or shorter than the diameter at the top part of the vessel, in order that separated skim milk may not remain in the vessel.

17 is the cover of the drum with tightening ring 18 and locking ring 19.

Owing to the fact that the cream receiving vessel is loosely mounted in the drum it may easily be removed from the same and cleaned.

Having now described my invention, what I claim as new and desire to secure by Letters Patent is:

1. In an intermittently operating cream separator the combination of a drum, means for rotating the same, and a central cream receiving vessel mounted in the said drum in a detachable manner and partaking in its rotary motion, the said vessel having an open top, and freely and directly communicating at said top with the interior of the drum, substantially as described and for the purpose set forth.

2. In an intermittently operating cream separator the combination of a drum, means for rotating the same and a central cream receiving vessel mounted in the said vessel in such manner that it can move freely axially, the said vessel partaking in the rotary motion of the drum substantially as described.

3. In an intermittently operating cream separator the combination of a drum, means for rotating the same, and a central cream receiving vessel mounted in the drum and partaking in its rotary motion, the outer side of the said vessel slanting inward from the bottom of the vessel toward the top thereof.

4. In an intermittently operating cream separator the combination of a drum, means for rotating the same and a central cream receiving vessel mounted in the said drum and partaking in its rotary motion, the outer side of the said vessel slanting inwardly from the bottom toward the top thereof, and the inner side of the vessel having substantially the same diameter at the top as at the bottom.

5. In an intermittently operating cream separator the combination of a drum, means for rotating the same, a central cream receiving vessel mounted on the bottom of the said drum and partaking in its rotary motion and a ridge provided on the bottom of the drum and surrounding the bottom edge of the said vessel.

In witness whereof, I have hereunto signed my name.

GUSTAF WILHELM JOHANSSON.

Copies of this patent may be obtained for five cents each, by addressing the "Commissioner of Patents, Washington, D. C."